(12) United States Patent
Wong

(10) Patent No.: US 9,799,961 B2
(45) Date of Patent: Oct. 24, 2017

(54) COMPENSATION CIRCUIT, ANTTENNA UNIT, AND MIMO SYSTEM

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Kwo-Jyr Wong, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/219,330

(22) Filed: Jul. 26, 2016

(65) Prior Publication Data
US 2017/0250472 A1    Aug. 31, 2017

(30) Foreign Application Priority Data
Feb. 29, 2016 (TW) .............................. 105106037 A

(51) Int. Cl.
| H01P 5/00 | (2006.01) |
|---|---|
| H01Q 21/00 | (2006.01) |
| H01Q 1/50 | (2006.01) |
| H01Q 3/34 | (2006.01) |
| H01P 1/38 | (2006.01) |
| H01P 1/22 | (2006.01) |
| H01P 5/12 | (2006.01) |
| H04B 7/0426 | (2017.01) |
| H04B 15/00 | (2006.01) |

(52) U.S. Cl.
CPC ........... *H01Q 21/0006* (2013.01); *H01P 1/22* (2013.01); *H01P 1/38* (2013.01); *H01P 5/12* (2013.01); *H01Q 1/50* (2013.01); *H01Q 3/34* (2013.01); *H04B 7/0426* (2013.01); *H04B 15/00* (2013.01)

(58) Field of Classification Search
CPC .... H01Q 1/50; H01Q 3/34; H01P 1/38; H01P 1/22; H01P 5/12; H04B 7/0426; H04B 15/00
See application file for complete search history.

(56) References Cited

U.S. PATENT DOCUMENTS

| 8,045,925 B2* | 10/2011 | Wong | ................... H04B 1/18 375/345 |
| 8,233,520 B2* | 7/2012 | Wong | ................... H04B 1/0475 375/219 |
| 9,136,883 B1* | 9/2015 | Moher | ................. H04B 1/0042 |
| 2009/0213770 A1 | 8/2009 | Mu | |
| 2010/0093282 A1 | 4/2010 | Martikkala et al. | |
| 2013/0301487 A1 | 11/2013 | Khandani | |
| 2015/0163044 A1* | 6/2015 | Analui | ................. H04L 5/1461 370/295 |
| 2015/0200455 A1* | 7/2015 | Venkateswaran | ...... H01Q 1/246 342/372 |
| 2016/0381570 A1* | 12/2016 | Lysejko | .............. H04L 41/0806 455/562.1 |

* cited by examiner

*Primary Examiner* — Dac Ha
(74) *Attorney, Agent, or Firm* — Steven Reiss

(57) ABSTRACT

A compensation circuit in a MIMO system includes a phase shifting circuit and an attenuation circuit. The phase shifting circuit includes a plurality of phase shifters coupled in parallel which apply compensation to signals. The attenuation circuit includes a plurality of attenuators coupled in parallel to apply compensation to signals.

19 Claims, 14 Drawing Sheets

| | | θc−2ψ | θc−ψ | θc | θc+ψ | θc+2ψ | | | |
|---|---|---|---|---|---|---|---|---|---|
| | V1,V2,V3... | V1,V2,V3... | V1,V2,V3... | V1,V2,V3... | V1,V2,V3... | V1,V2,V3... | V1,V2,V3... | V1,V2,V3... | V1,V2,V3... |
| D11+2Δ | V1,V2,V3... | V1,V2,V3... | V1,V2,V3... | V1,V2,V3... | V1,V2,V3... | V1,V2,V3... | V1,V2,V3... | V1,V2,V3... | V1,V2,V3... |
| D11+Δ | V1,V2,V3... | V1,V2,V3... | V1,V2,V3... | V1,V2,V3... | V1,V2,V3... | V1,V2,V3... | V1,V2,V3... | V1,V2,V3... | V1,V2,V3... |
| D11' | V1,V2,V3... | V1,V2,V3... | V1,V2,V3... | V1,V2,V3... | V1,V2,V3... | V1,V2,V3... | V1,V2,V3... | V1,V2,V3... | V1,V2,V3... |
| D11−Δ | V1,V2,V3... | V1,V2,V3... | V1,V2,V3... | V1,V2,V3... | V1,V2,V3... | V1,V2,V3... | V1,V2,V3... | V1,V2,V3... | V1,V2,V3... |
| D11−2Δ | V1,V2,V3... | V1,V2,V3... | V1,V2,V3... | V1,V2,V3... | V1,V2,V3... | V1,V2,V3... | V1,V2,V3... | V1,V2,V3... | V1,V2,V3... |
| | V1,V2,V3... | V1,V2,V3... | V1,V2,V3... | V1,V2,V3... | V1,V2,V3... | V1,V2,V3... | V1,V2,V3... | V1,V2,V3... | V1,V2,V3... |

FIG. 12

COMPENSATION CIRCUIT, ANTTENNA UNIT, AND MIMO SYSTEM

CROSS-REFERENCE TO RELATED APPLICATIONS

This application claims priority to Taiwanese Patent Application No. 105106037 filed on Feb. 29, 2016 and Taiwanese Patent Application No. 105106040 filed on Feb. 29, 2016, the contents of which are incorporated by reference herein.

FIELD

The subject matter herein generally relates to a compensation circuit, an antenna unit, and a multiple input multiple output system.

BACKGROUND

Noise is generated in signals when the signals are being transmitted.

BRIEF DESCRIPTION OF THE DRAWINGS

Implementations of the present technology will now be described, by way of example only, with reference to the attached figures.

FIG. 12 is a schematic diagram of an embodiment of a look-up table.

DETAILED DESCRIPTION

Figure 1:
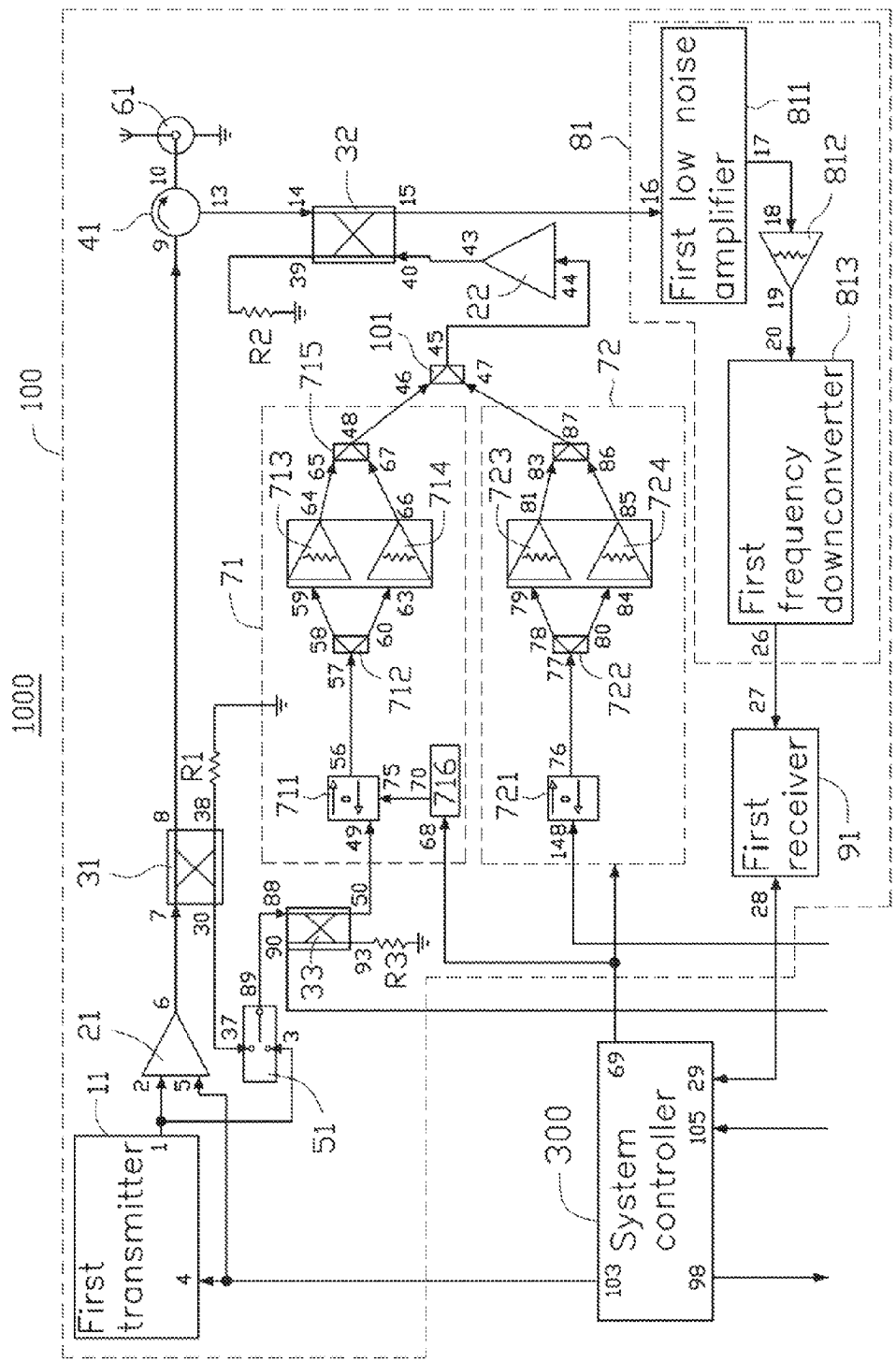
FIG. 1 is a first part of a circuit diagram of an embodiment of a MIMO system of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

Figure 2:
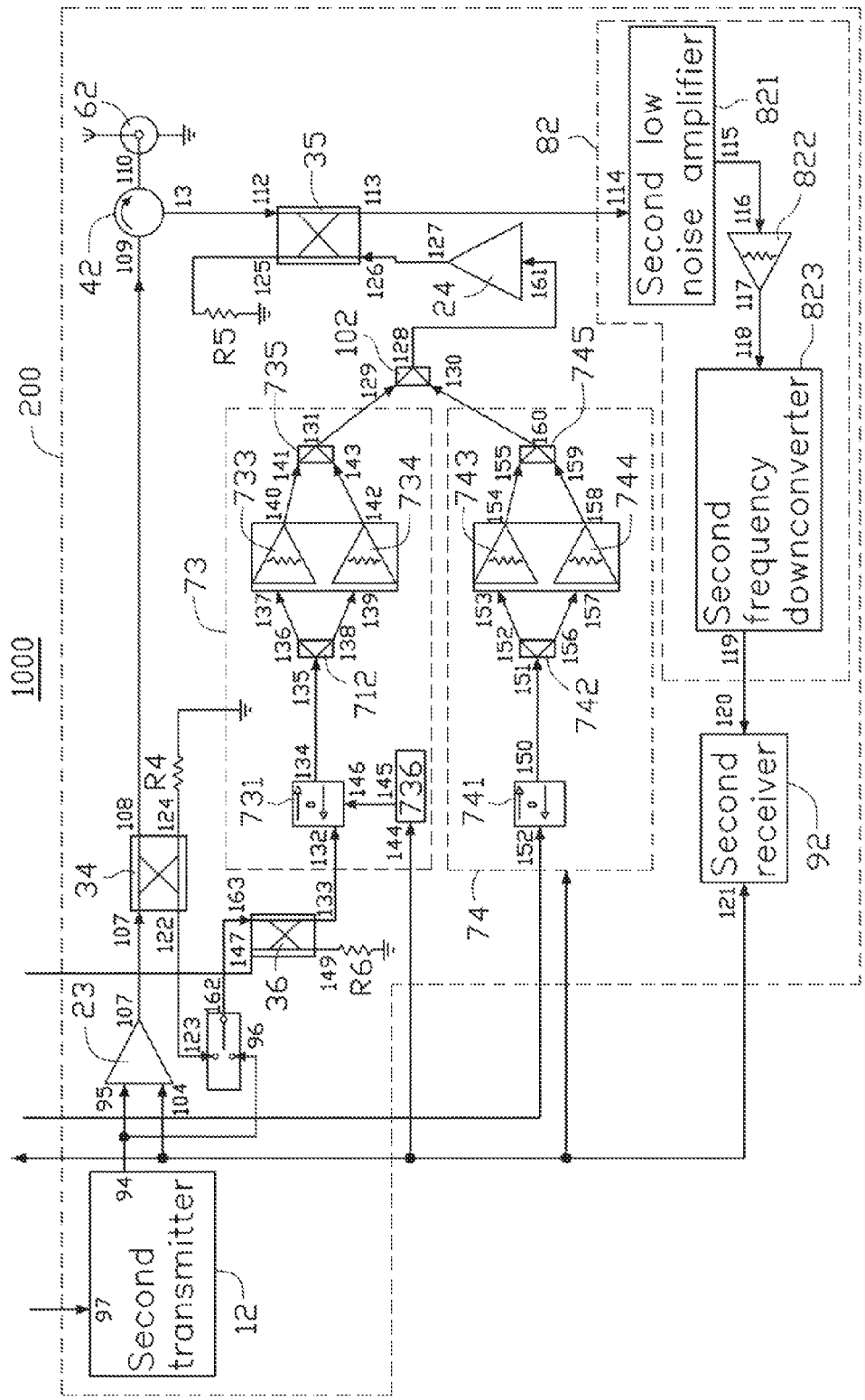
FIG. 2 is a second part of the circuit diagram of the MIMO system in FIG. 1.

FIGS. 1 and 2 illustrate a multiple input multiple output (MIMO) system 1000. The MIMO system 1000 can comprise a first antenna unit 100, a second antenna unit 200, and a system controller 300.

The first antenna unit 100 can comprise a first transmitter 11, a first amplifier 21, a second amplifier 22, a first coupler 31, a second coupler 32, a third coupler 33, a first circulator 41, a first electronic switch 51, a first antenna 61, a first compensation circuit 71, a second compensation circuit 72, a first noise suspension circuit 81, a first receiver 91, a first power combiner 101, a first resistor R1, a second resistor R2, and a third resistor R3.

A first transmitter first terminal 1 is coupled to a first amplifier first input terminal 2. The first transmitter first terminal 1 is also coupled to a first electronic switch first terminal 3. A first transmitter second terminal 4 is coupled to a system controller first terminal 103. The first transmitter second terminal 4 is also coupled to a first amplifier second input terminal 5. A first amplifier output terminal 6 is coupled to a first coupler first terminal 7.

A first coupler second terminal 8 is coupled to a first circulator first terminal 9. A first circulator second terminal 10 is coupled to the first antenna 61. A first circulator third terminal 13 is coupled to a second coupler first terminal 14. A second coupler second terminal 15 is coupled to the first noise suspension circuit 81.

The first noise suspension circuit 81 can comprise a first low noise amplifier 811, a first attenuator 812, and a first frequency down-converter 813. The second coupler second terminal 15 is coupled to a first low noise amplifier first terminal 16. A first low noise amplifier second terminal 17 is coupled to a first low noise amplifier first terminal 18. A first attenuator output terminal 19 is coupled to a first frequency down-converter first terminal 20. A first frequency down-converter second terminal 26 is coupled to a first receiver first terminal 27. A first receiver second terminal 28 is coupled to a system controller second terminal 29.

A first coupler third terminal 30 is coupled to a first electronic switch second terminal 37. A first coupler fourth terminal 38 is grounded through the first resistor R1.

A second coupler third terminal 39 is grounded through the second resistor R2. A second coupler fourth terminal 40 is coupled to a second amplifier output terminal 43. A second amplifier input terminal 44 is coupled to a first power combiner output terminal 45. A first power combiner first input terminal 46 is coupled to the first compensation circuit 71. A first power combiner second input terminal 47 is coupled to the second compensation circuit 72.

The first compensation circuit 71 is coupled to a first phase shifter 711, a first power divider 712, a second attenuator 713, a third attenuator 714, a second power combiner 715, and a first digital to analog converter (DAC) 716.

The first power combiner first input terminal 46 is coupled to a second power combiner output terminal 48. A first phase shifter input terminal 49 is coupled to a third coupler second terminal 50. A first phase shifter output terminal 56 is coupled to a first power divider input terminal 57. A first power divider first output terminal 58 is coupled to a second attenuator input terminal 59. A first power divider second output terminal 60 is coupled to a third attenuator input terminal 63. A second attenuator output terminal 64 is coupled to a second power combiner first input terminal 65. A third attenuator output terminal 66 is coupled to a second power combiner second input terminal 67. A first DAC input terminal 68 is coupled to a system controller third terminal 69. A first DAC output terminal 70 is coupled to a first phase shifter input terminal 75.

The second compensation circuit 72 can comprise a second phase shifter 721, a second power divider 722, a fourth attenuator 723, a fifth attenuator 724, and a third power combiner 725. A second phase shifter output terminal 76 is coupled to a second power combiner input terminal 77. A second power divider output terminal 78 is coupled to a fourth attenuator input terminal 79. A second power divider output terminal 80 is coupled to a third power combiner input terminal 83 through the fifth attenuator 724. The second power divider output terminal 80 is coupled to a fifth attenuator input terminal 84. A fifth attenuator output terminal 85 is coupled to a third power combiner input terminal 86. A third power combiner output terminal 87 is coupled to the first power combiner second input terminal 47.

A third coupler first terminal 88 is coupled to a first electronic switch third terminal 89. A third coupler fourth terminal 93 is grounded through the resistor R3.

The system controller third terminal 69 is coupled to the second compensation circuit 72.

The first transmitter 11 is configured to transmit signals. The first amplifier 21 is configured to amplify signals from the first transmitter 11. The first receiver 91 is configured to receive signals. The first low noise amplifier 811 is configured to amplify signals from the first receiver 91. The first circulator 41 is a clockwise circulator with three ports to isolate the signal received and the signal to be transmitted. The first coupler 31 and the second coupler 32 are coupled to the first circulator 41 to match input impedance of the first circulator 41 to output impedance of the first circulator 41.

Two kinds of noise exist when the MIMO system 1000 operates. The first kind of noise is signals leaking from a leaking path that transmitters to circulators, and further to couplers and receivers. The second kind of noise is near field generated by reflection of transmitted signal. Normally, the second interference noise path is composed by (1) circulator—antenna; (2) antenna—reflector; (3) reflector—antenna; (4) antenna—circulator due to antenna impedance mismatch; (5) circulator-coupler. This path is longer than that of the path in the first noise path.

The first compensation circuit 71 is configured for cancellation of the first kind of noise. The second compensation circuit 72 is configured for cancellation of the second kind of noise.

The second antenna unit 200 can comprise a second transmitter 12, a third amplifier 23, a fourth amplifier 24, a fourth coupler 34, a fifth coupler 35, a sixth coupler 36, a second circulator 42, a second electronic switch 52, a second antenna 62, a third compensation circuit 73, a fourth compensation circuit 74, a second noise suspension circuit 82, a second receiver 92, a fourth power combiner 102, a resistor R4, a resistor R5, and resistor R6.

A second transmitter first terminal 94 is coupled to a third amplifier input terminal 95. The second transmitter first terminal 94 is also coupled to a second electronic switch first terminal 96. A second transmitter second terminal 97 is coupled to a system controller fourth terminal 98. A second amplifier second input terminal 104 is coupled to a system controller fifth terminal 105. A second amplifier output terminal 106 is coupled to a second circulator first terminal 109 through a fourth coupler first terminal 107 and a fourth coupler second terminal 108 in that order. A second circulator second terminal 110 is coupled to the second antenna 62. A second circulator third terminal 111 is coupled to a fifth coupler 112. A fifth coupler second terminal 113 is coupled to the second noise suspension circuit 82.

The second noise suspension circuit 82 can comprise a second low noise amplifier 821, a sixth attenuator 822, and a second frequency downconverter 823. The fifth coupler second terminal 113 is coupled to a second low noise amplifier first terminal 114. A second low noise amplifier second terminal 115 is coupled to a sixth attenuator first terminal 116. A sixth attenuator output terminal 117 is coupled to a second frequency downconverter first terminal 118. A second frequency downconverter second terminal 119 is coupled to a second receiver first terminal 120. A second receiver second terminal 121 is coupled to the system controller fifth terminal 105.

A fourth coupler third terminal 122 is coupled to a second electronic switch second terminal 123. A fourth coupler fourth terminal 124 is grounded through the resistor R4.

A fifth coupler third terminal 125 is grounded through the resistor R5. A fifth coupler fourth terminal 126 is coupled to a fourth amplifier output terminal 127. A fourth amplifier input terminal 161 is coupled to a fourth power combiner output terminal 128. A fourth power combiner first input terminal 129 is coupled to the third compensation circuit 73. A fourth power combiner second input terminal 130 is coupled to the fourth compensation circuit 74.

The third compensation circuit 73 can comprise a third phase shifter 731, a third power divider 732, a seventh attenuator 733, an eighth attenuator 734, a fifth power combiner 735, and a second DAC 736.

The fourth power combiner first input terminal 129 is coupled to a fifth power combiner output terminal 131. A third phase shifter input terminal 132 is coupled to a sixth coupler second terminal 133. A third phase shift output terminal 134 is coupled to a third power divider input terminal 135. A third power divider first output terminal 136 is coupled to a seventh attenuator input terminal 137. A third power divider second output terminal 138 is coupled to an eighth attenuator input terminal 139. A seventh attenuator output terminal 140 is coupled to a fifth power combiner first input terminal 141. An eighth attenuator output terminal 142 is coupled to a fifth power combiner second input terminal 143. A second DAC input terminal 144 is coupled to the system controller fifth terminal 105. A second DAC output terminal 145 is coupled to a third phase shifter input terminal 146. A sixth coupler third terminal 147 is coupled to a second phase shifter input terminal 148. A sixth coupler fourth terminal 149 is grounded through the sixth resistor R6.

The fourth compensation circuit 74 can comprise a fourth phase shifter 741, a fourth power divider 742, a ninth attenuator 743, a tenth attenuator 744, and a sixth power combiner 745. A fourth phase shifter output terminal 150 is coupled to a fourth power divider input terminal 151. A fourth phase shifter input terminal 152 is coupled to a third coupler third terminal 90. A fourth power divider output terminal 152 is coupled to a ninth attenuator input terminal 153. A ninth attenuator output terminal 154 is coupled to a sixth power combiner input terminal 155. A fourth power divider output terminal 156 is coupled to a tenth attenuator input terminal 157. A tenth attenuator output terminal 158 is coupled to a sixth power combiner input terminal 159. A sixth power combiner output terminal 160 is coupled to the fourth power combiner second input terminal 130.

A second electronic switch third terminal 162 is coupled to a sixth coupler first terminal 163.

The system controller fifth terminal 105 is coupled to the third compensation circuit 73 and the fourth compensation circuit 74.

Similarly, the second transmitter 12 is configured to transmit signals. The third amplifier 23 is configured to amplify signals from the second transmitter 12. The second receiver 92 is configured to receive signals. The second low noise amplifier 821 is configured to amplify signals from the second receiver 92. The second circulator 42 is a clockwise circulator with three ports to isolate the signal received and the signal to be transmitted. The fourth coupler 34 and the sixth coupler 36 are coupled to the second circulator 42 to match input impedance of the second circulator 42 to output impedance of the second circulator 42.

The third compensation circuit 73 is configured for cancellation of the first kind of noise. The fourth compensation circuit 74 is configured for cancellation of the second kind of noise.

When the first electronic switch third terminal 89 is coupled to the first electronic switch first terminal 3, the first antenna unit 100 is in a first mode.

When the first electronic switch third terminal 89 is coupled to the first electronic switch second terminal 37, the first antenna unit 100 is in a second mode.

When the second electronic switch third terminal 162 is coupled to the second electronic switch first terminal 96, the second antenna unit 200 is in a first mode.

When the second electronic switch third terminal 162 is coupled to the second electronic switch second terminal 123, the second antenna unit 200 is in a second mode.

The first mode can be a correcting mode. The second mode can be a compensating mode.

When the first antenna unit 100 is in the first mode, a first signal from the first transmitter 11 is transmitted through the first electronic switch 51 and the first coupler 31 to the first compensation circuit 71 in that order. The first signal is also amplified by the first amplifier 21 and transmitted to the first antenna 61 through the first coupler 31 and the first circulator 41 in that order. A leaked signal is generated in the first circulator 41. The first signal is transmitted to the first power combiner 101 after being compensated for by the first compensation circuit 71. A second signal from the sixth coupler 36 is compensated by the second compensation circuit 72. Then the second signal is transmitted to the first power combiner 101. The first power combiner 101 generates a first suspension signal and transmits the first suspension signal to the second coupler 32 through the second amplifier 22. The second coupler 32 receives a third signal through the first circulator third terminal 13. The second coupler 32 couples the third signal and the first suspension signal and outputs the coupled signal to the first receiver 91.

The system controller 300 is configured to monitor an operating status of the MIMO system 1000. The system controller 300 is also configured to apply compensation to signals in a preset plan. A compensation for signals can be compensation in the phase of signals, the amplitude of signals, or the strength of signals. The system controller 300 is also configured to detect signals received by the first receiver 91 and adjust the preset plan according to the detection.

The second antenna unit 200 operates similarly to the first antenna unit.

The second amplifier 22 is a RF amplifier. The fourth amplifier 24 is a RF amplifier.

In one embodiment, the MIMO system 1000 can comprises more antenna units, such as four antenna units.

Figure 3:
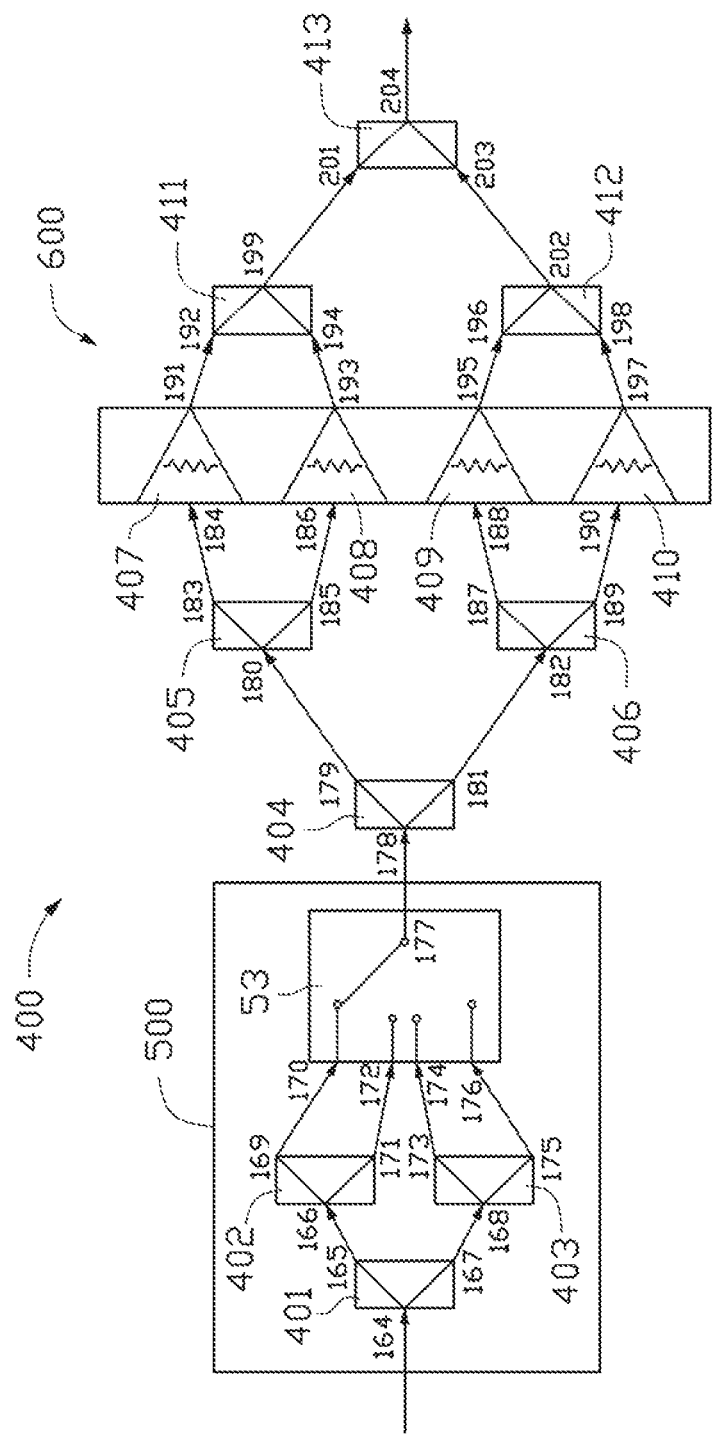
FIG. 3 is a circuit diagram of an embodiment of a compensation circuit of the MIMO system of FIG. 1.

FIG. 3 illustrates an embodiment of a compensation circuit 400.

The compensation circuit 400 can comprise a phase shifting circuit 500 and an attenuation circuit 600. The phase shifting circuit 500 can comprise a fifth power divider 401, a sixth power divider 402, a seventh power divider 403, and a third electronic switch 53. The attenuation circuit 600 can comprise an eighth power divider 404, a ninth power divider 405, a tenth power divider 406, a eleventh attenuator 407, a twelfth attenuator 408, a thirteenth attenuator 409, and a fourteenth attenuator 410, a seventh power combiner 411, an eighth power combiner 412, and a ninth power combiner 413.

A fifth power divider input terminal 164 is configured to receive a signal. A fifth power divider first output terminal 165 is coupled to a sixth power divider input terminal 166. A fifth power divider second output terminal 167 is coupled to a seventh power divider input terminal 168. A sixth power divider first output terminal 169 is coupled to a third electronic switch first terminal 170. A sixth power divider second output terminal 171 is coupled to a third electronic switch second terminal 172. A seventh power divider first output terminal 173 is coupled to a third electronic switch third terminal 174. A seventh power divider second output terminal 175 is coupled to a third electronic switch fourth terminal 176. A third electronic switch control terminal 177 is coupled to an eighth power divider input terminal 178. An eighth power divider first output terminal 179 is coupled to a ninth power divider input terminal 180. An eighth power divider second output terminal 181 is coupled to a tenth power divider input terminal 182. A ninth power divider first output terminal 183 is coupled to a eleventh attenuator input terminal 184. A ninth power divider second output terminal 185 is coupled to a twelfth attenuator input terminal 186. A tenth power divider first output terminal 187 is coupled to a thirteenth attenuator input terminal 188. A tenth power divider second output terminal 189 is coupled to a fourth attenuator input terminal 190.

An eleventh attenuator 191 is coupled to a seventh power combiner first input terminal 192. A twelfth attenuator output terminal 193 is coupled to a seventh power combiner second input terminal 194. A thirteenth attenuator 195 is coupled to an eighth power combiner first input terminal 196. A fourteenth attenuator output terminal 197 is coupled to an eighth power combiner second input terminal 198. A seventh power combiner output terminal 199 is coupled to a ninth power combiner first input terminal 201. An eighth power combiner output terminal 202 is coupled to a ninth power combiner second input terminal 203. A ninth power combiner output terminal 204 is configured to output signals.

The phase shifting circuit 500 is used to determine a phase quadrant of compensation applied to input signals.

In the embodiment, the fifth power divider 401 is an orthogonal power divider which can cover 90 degrees. The fifth power divider first output terminal 165 can be configured to output a signal of which the phase is adjusted by 0 degrees. The fifth power divider second output terminal 167 can be configured to output a signal of which the phase is adjusted by 90 degrees.

In the embodiment, the sixth power divider 402 is an orthogonal power divider which can cover 180 degrees. The sixth power divider first output terminal 169 can be configured to output a signal phase-adjusted by 0 degrees. The sixth power divider second output terminal 171 can be configured to output a signal phase-adjusted by 180 degrees.

In the embodiment, the seventh power divider 403 is an orthogonal power divider which can cover 180 degrees. The seventh power divider first output terminal 173 can be configured to output a signal phase-adjusted by 90 degrees. The seventh power divider second output terminal 175 can be configured to output a signal phase-adjusted by 270 degrees. Thus, the phase shifting circuit 500 can cover 0-270 degrees.

The attenuation circuit 600 is configured to further determine the degree of compensation to be applied to signals in amplitude and phase. The attenuation circuit 600 can comprise orthogonal phase shifters and high resolution attenuators. The attenuation circuit 600 is configured to apply adjustment to signals which have quadrants determined by the phase shifting circuit 500.

The eighth power divider 404 is an orthogonal power divider which can cover 90 degrees. The eighth power divider first output terminal 179 outputs zero phase. Thus, the subsequent signals are true reflections of real signals. The phase of signals from the eighth power divider second output terminal 181 is shifted by 90 degrees. The subsequent signals are thus imaginary signals. When the real components of signals and imaginary components of signals are combined, the phase of signals can be adjusted through 0-90 degrees.

The ninth power divider 405 and the tenth power divider 406 are equi-phase power dividers.

The seventh power combiner 411, the eighth power combiner 412, and the ninth power combiner 413 are equi-phase power combiners.

Figure 4:
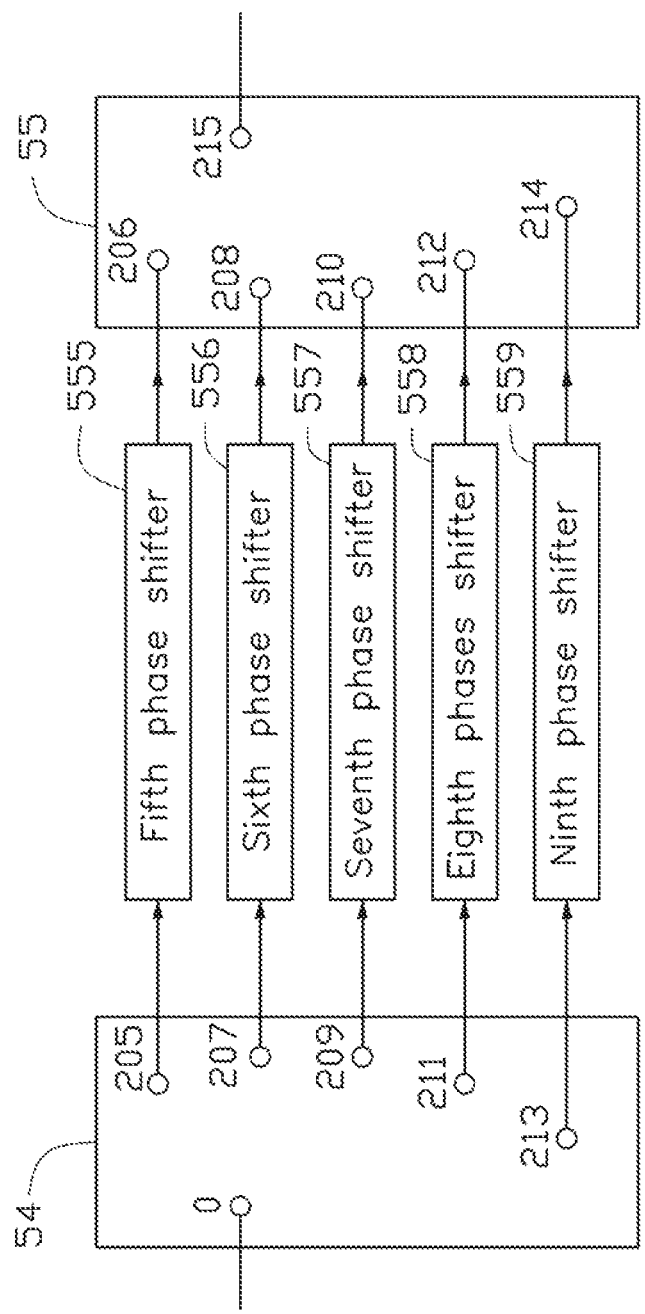
FIG. 4 is a circuit diagram of an embodiment of a phase shifting circuit in the compensation circuit of the MIMO system of FIG. 3.

FIG. 4 illustrates another embodiment of a phase shifting circuit 700.

The phase shifting circuit 700 can comprise a fourth electronic switch 54, a fifth electronic switch 55, a fifth phase shifter 555, a sixth phase shifter 556, a seventh phase shifter 557, an eighth phase shifter 558, and a ninth phase shifter 559.

A fourth electronic switch control terminal 0 is configured to receive signals. A fourth electronic switch first output terminal 205 is coupled to a fifth electronic switch first output terminal 206 through the fifth phase shifter 555. A fourth electronic switch first output terminal 207 is coupled to a fifth electronic switch first output terminal 208 through the sixth phase shifter 556. A fourth electronic switch third output terminal 209 is coupled to a fifth electronic switch third input terminal 210 through the seventh phase shifter 557. A fourth electronic switch fourth output terminal 211 is coupled to a fifth electronic switch fourth input terminal 212 through the eighth phase shifter 558. A fourth electronic switch fifth output terminal 213 is coupled to a fifth electronic switch fifth input terminal 214 through the ninth phase shifter 559. A fifth electronic switch control terminal 215 is configured to output signals.

The fourth electronic switch control terminal 0 can be coupled to one output terminal of the fourth electronic switch 54 by selection.

The fifth electronic switch control terminal 215 can be coupled to one output terminal of the fifth electronic switch 55 by selection.

Figure 5:
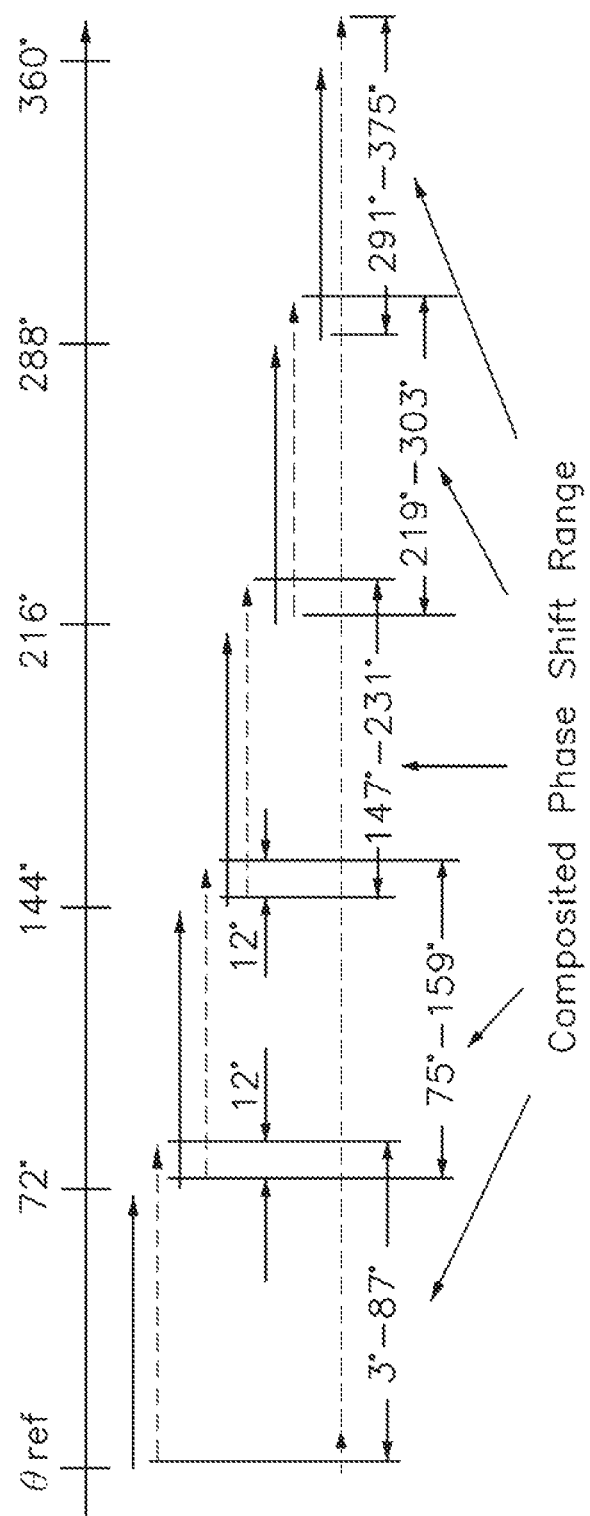
FIG. 5 shows 5 coarse phase shifters in an embodiment of the phase shifting circuit providing the overlapped phase space over 360 degree range of FIG. 4.

FIG. 5 illustrates 5 coarse phase shifters in an embodiment of the phase shifting circuit 700 providing the overlapped phase space over 360 degree range. The fifth phase shifter 555 can be selected to achieve a phase shift range 3°-87°. The sixth phase shifter 556 can be selected to achieve a phase shift range 75°-159°. The seventh phase shifter 557 can be selected to achieve a phase shift range 147°-231°. The eighth phase shifter 558 can be selected to achieve a phase shift range 219°-303°. The ninth phase shifter 559 can be selected to achieve a phase shift range 291°-375°.

Referring to FIG. 3, in at least one embodiment, take a phase shift "a" in the leaking path for example, the eighth power divider 404 is a 90-degree, 3 db power divider, a signal outputted from the eighth power divider 404 is Sin(wt+a)=sin(wt)*cos(a)+cos(wt)*sin(a)=cos(a)*sin(wt)+sin(a)*cos(wt)=cos(a)*sin(wt)+sin(a)*sin(wt+pi/2). If we adjust the eleventh attenuator 407, twelfth attenuator 408, thirteenth attenuator 409, and fourteenth attenuator 410, corresponding to the signal we can adjust the phase shift of attenuation circuit 600.

In at least one embodiment, take the phase shift "a" and an amplitude shift "A" in the leaking path for example, the eighth power divider 404 is also a 90-degree, 3 db power divider, a signal outputted from the eighth power divider 404 is A*sin(wt+a)=A*cos(a)*sin(wt)+A*sin(a)*sin(wt+pi/2)=C*sin(wt)+D*sin(wt+pi/2). If we adjust the eleventh attenuator 407, twelfth attenuator 408, thirteenth attenuator 409, and fourteenth attenuator 410, corresponding to the signal we can adjust the phase shift of attenuation circuit 600.

The power divider/combiner may be composed by 0-degree (Wilkinson), 90-degree and 180-degree phase different component. We may put 90-degree power divider in the eighth power divider 404, and use Wilkinson divider in all other power divider and power combiner. In at least one embodiment, we put pair of the eleventh attenuator 407 ant the twelfth attenuator 408, the thirteenth attenuator 409 and the fourteenth attenuator 410 together for tuning pair (top half and bottom half part).

Various attenuator tuning will provide the possibility to cancel the RF leakage and reflection signal if the tuning resolution on both phase and amplitude is good enough.

Figure 6:
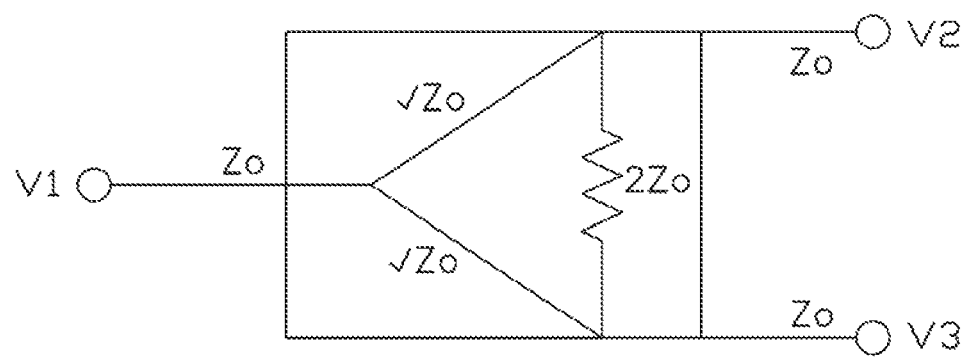
FIG. 6 is a schematic diagram of an embodiment of a Wilkinson power divider.

Referring to FIG. 6, the S parameters in Wilkinson power divider is as below:

$$[S] = \begin{vmatrix} 0 & -j/\sqrt{2} & -j/\sqrt{2} \\ -j/\sqrt{2} & 0 & 0 \\ -j/\sqrt{2} & 0 & 0 \end{vmatrix}$$

$$\begin{vmatrix} 0 \\ V2 \\ V3 \end{vmatrix} = \begin{vmatrix} 0 & -j/\sqrt{2} & -j/\sqrt{2} \\ -j/\sqrt{2} & 0 & 0 \\ -j/\sqrt{2} & 0 & 0 \end{vmatrix} \begin{vmatrix} 1 \\ 0 \\ 0 \end{vmatrix} = \begin{vmatrix} 0 \\ -j/\sqrt{2} \\ -j/\sqrt{2} \end{vmatrix}$$

Figure 7:
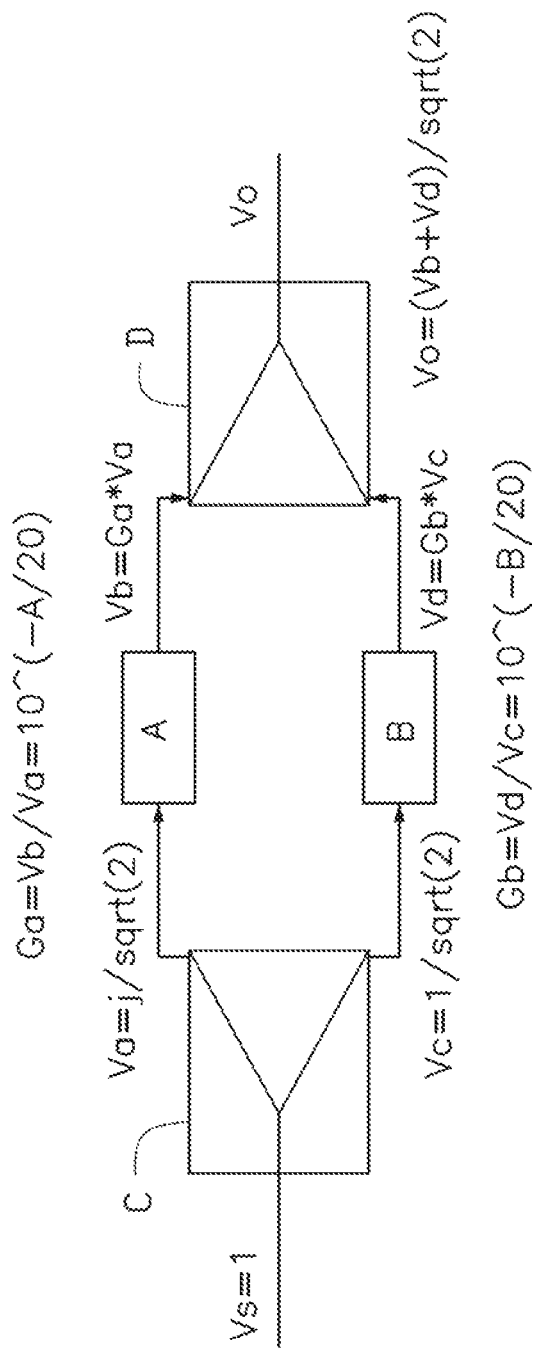
FIG. 7 is a schematic diagram of an embodiment of an orthogonal attenuator (OA).

FIG. 7 illustrates an orthogonal attenuator (OA) in an embodiment. The OA is configured to transform signal to various amplitude and phase shift at 90-degree range. The OA can include a 90-degree hybrid power divider C, two digital step attenuators A and B, and a Wilkinson power combiner D. $Vb=Va*Ga=j/(2)*10^{\wedge}(-A/20)$; $Vd=Vc*Gb=1/(2)*10^{\wedge}(-B/20)$; $Vo=(Vb/(\sqrt{2})+Vd/(\sqrt{2}))=(j*10^{\wedge}(-A/20)+10^{\wedge}(-B/20))/2$; Phase shift=arc Tan $((10^{\wedge}(-A/20))/(10^{\wedge}(-B/20)))$; and $Am=sqrt((10^{\wedge}(A/10)+10^{\wedge}(B/10))/4)$. So, the composited Attenuation=$20*\log(Vo/Vs)=20*\log(Am)$ (dB). In at least one embodiment, the OA transform signal to various amplitude and phase shift at a possible fine tuning range from 3°-87° and may lose his function below 3° and up 87° in a first quadrant angle.

Figure 8:
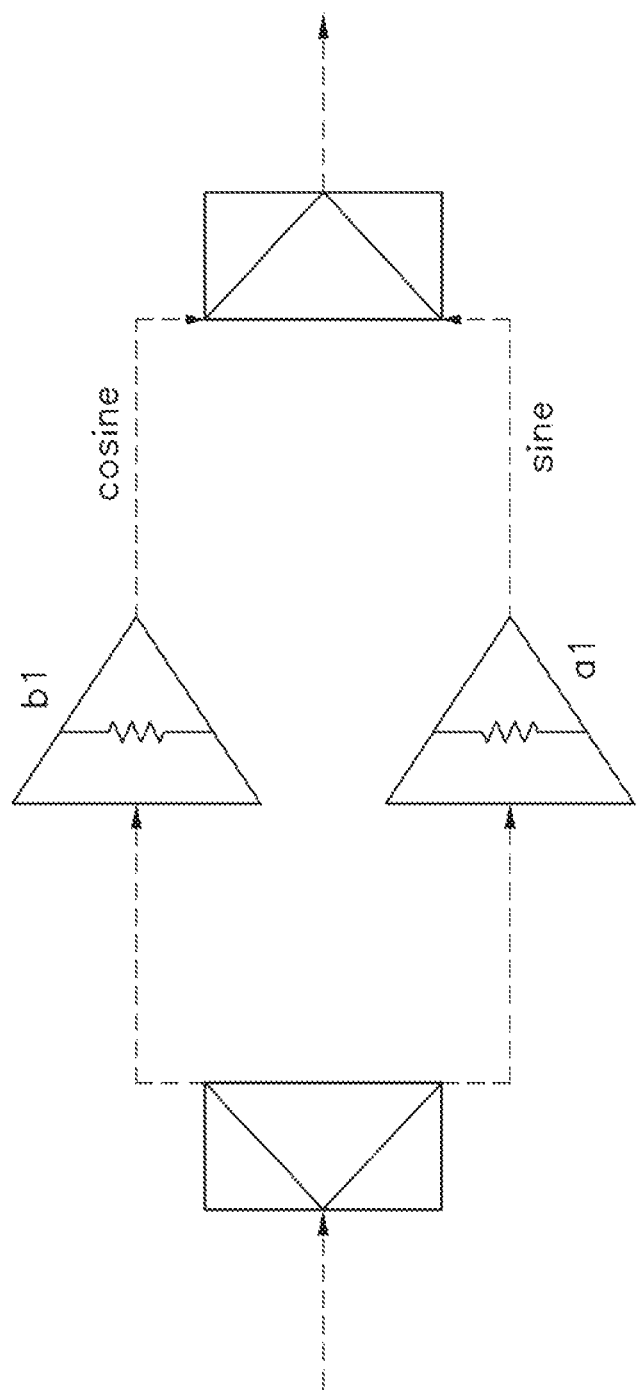
FIG. 8 is a schematic diagram of an embodiment of a basic cancellation quadrant with OA.

FIG. 8 illustrates a basic cancellation quadrant with OA in an embodiment. A 7-bit digital step attenuator was used for attenuation range between 0.25 to 32 dB (step size=0.25 dB). If the cancellation path were divided as cosine and sine parts, we may able to allocate the cancellation point on the quadrant using the two digital step attenuators a1 and b1.

Figure 9:
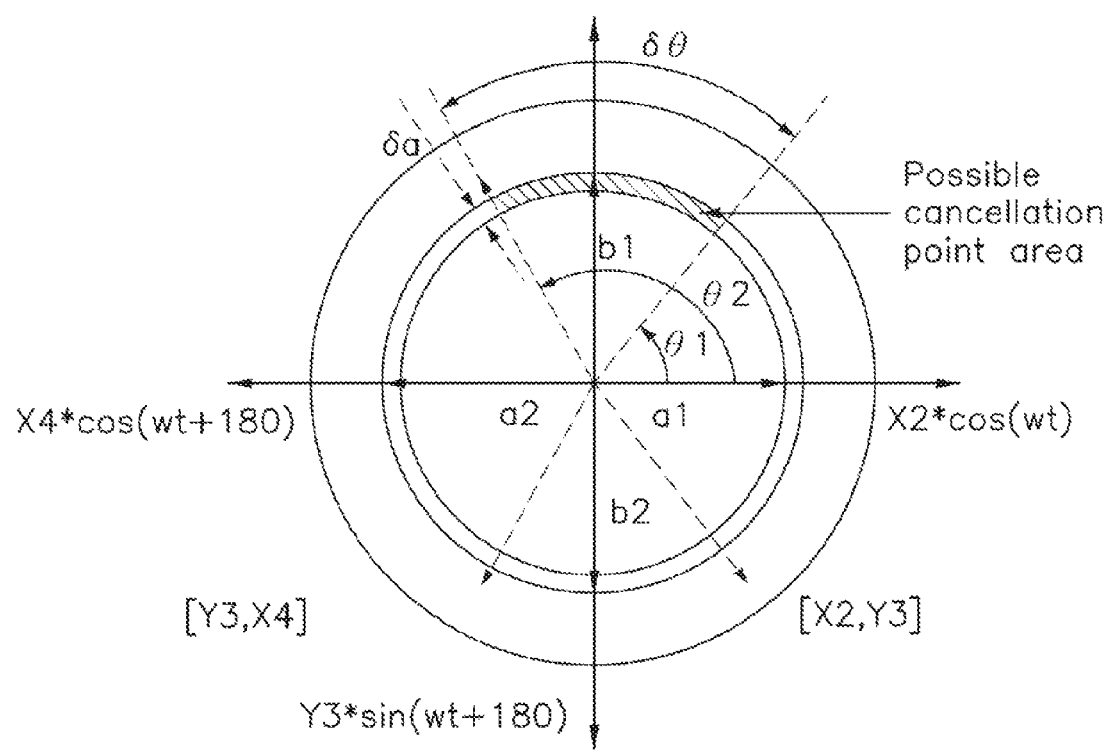
FIG. 9 is a schematic diagram of an embodiment of a cancellation point variation area.

FIG. 9 illustrates a cancellation point variation area in an embodiment. During the MIMO system in operation, the circuit component's properties may be changed due to temperature shift or something else. Let δθ: Phase variation (e.g, θ1 . . . θ2); δa: Amplitude variation (e.g, a1 . . . a2); δθ×δa: possible cancellation point area. In real operation, we may need to fine tune the cancellation point in the variation area in a small period. However, if we built a database, we are able to tune the cancellation point with a little effort.

Figure 10:
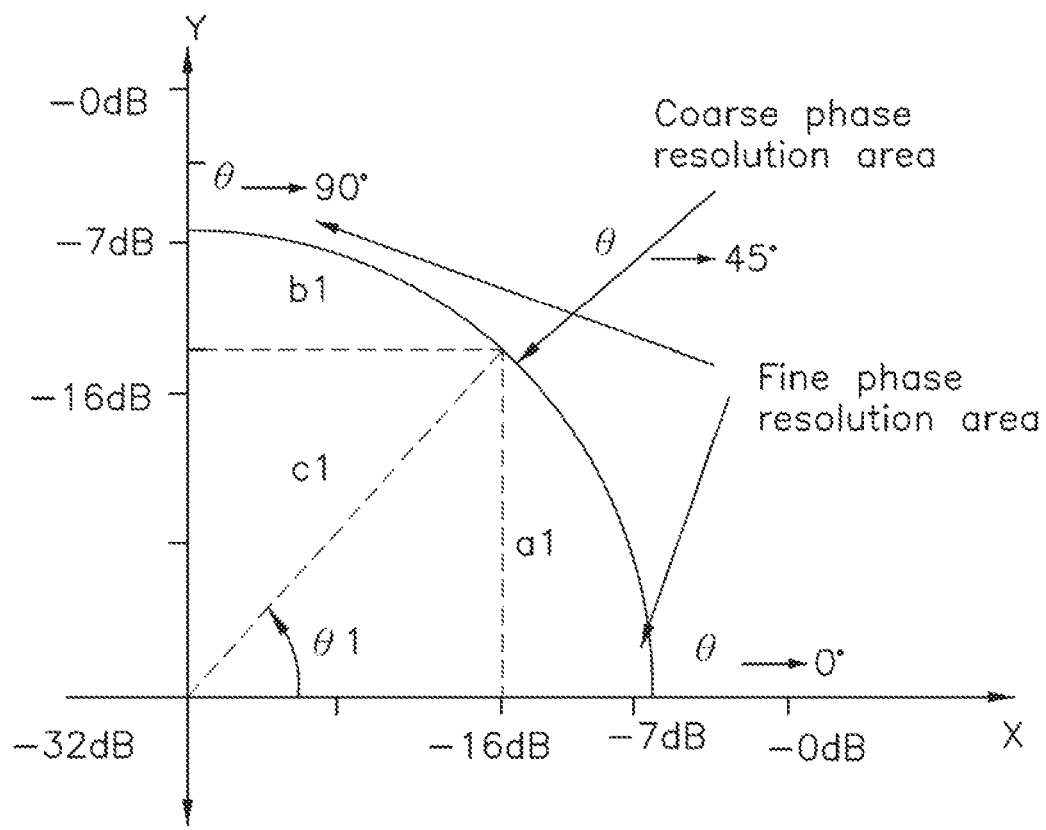
FIG. 10 is a schematic diagram of an embodiment of a single quadrant attenuators resolution.

FIG. 10 illustrates a single quadrant attenuators resolution in an embodiment. In an OA, attenuation resolution: for 7 bit with 0.25 dB step size, there are possible 128 levels in X-axis (b1 in fig OA); phase resolution: in case of amplitude is set at −6 dB, we may have (31−6)/0.25~100 steps in Y-axis (a1 in fig OA). Each Y-step may not have equal phase size: As illustrated in the right, assume that the target cancellation amplitude is −7.5 dB, we may select appropriate (X,Y) value combination to get a correct phase angle. A numerical analysis shown that if we select the attenuation value around 7.5 dB, we are able to get phase range almost 0→90 degree. However, the phase resolution near to X-axis or Y-axis have very fine resolution (<0.1-degree/step) but has coarse resolution (>1-degree/step) at around 45-degree area. We need to find some ways to get better phase resolution if we need more accuracy cancellation. One of the approach is to reduce the attenuation step size, such as from 0.25 dB/step down to 0.1 dB/step or less.

Due to the minimum impedance (~1.3 dB) of digital step attenuator, the phase deviation just between (1.58°~88.41-degree only. There are two gaps (0°~1.58° and 88.4°~90°) for cancellation. Improved method: 1, use a much less impedance attenuator (e.g., 0.2 dB, depend on requirement) impedance attenuator; 2, use 5 (e.g., FIG. 4) or more stages (360/5=72-degree) coarse attenuators; 3, use un-even distributed attenuation DSA which have much higher attenuation. In case of attenuator=(1.3–42 dB), $\phi_{min}$~0.5°, $\phi_{max}$=89.4°=(1.5~50 dB), $\phi_{min}$~0.215°, $\phi_{max}$=89.78°

Figure 11:
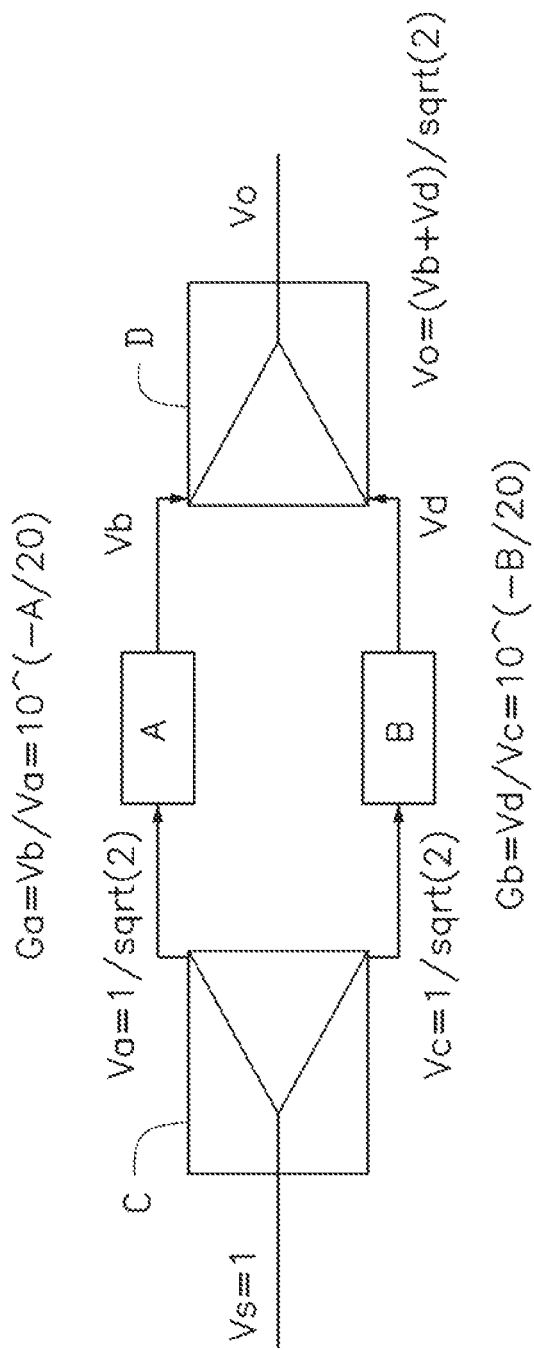
FIG. 11 is a schematic diagram of an embodiment of a composited attenuator.

FIG. 11 illustrates a composited attenuator in an embodiment. The composited attenuator is configured to transform low resolution attenuator into high resolution. The composited attenuator can include a Wilkinson power divider C, two digital step attenuators A and B, and a Wilkinson power combiner D. $Vb=Va*Ga=1/(\sqrt{2})*10^{\wedge}(-A/20)$; $Vd=Vc*Gb=1/(\sqrt{2})*10^{\wedge}(-B/20)$; $Vo=(Vb/(\sqrt{2})+Vd/(\sqrt{2}))=(10^{\wedge}(-A/20)+10^{\wedge}(-B/20))/2$. So, the composited attenuation=$20*\log(Vo/Vs)=20*\log(Vo)$ (dB).

For good cancellation, the accuracy cancellation signal on both phase and amplitude are required. There are some non-linear characteristic existed on programmable phase shifter and attenuators. For example, DNL (differential non-linearity), which is a maximum error between adjacent steps, and INL (integral non-linearity), which is maximum error vs. minimum reference line to a maximum attenuation level. In case of 0.25 dB step size device, these error may up to 0.45 dB, that will cause cancellation effect significantly.

These non-linear properties cause the cancellation hard to tune-in fine cancellation status. That will spend a lot of time in cancellation process It is needed a method to correct such kinds of non-linearity such that the phase shift and attenuation are kept in monotonic function. This is called linearization process. The corrected data are stored in a look-up table (shown as in FIG. 12) for fast and precision cancellation. In the look-up table, Δ is a step size in amplitude but has an approximate value which close to a pre-defined step, Φ is a step size in phase but has an approximate value which close to a pre-defined step, V1, V2, V3 . . . are control variables which are combined to form a specific (amplitude attenuation/phase shift) pair.

The linearization process can begin at step 1 as below:

Step 1: Initialization, which is that disable the normal Transmission path (PA1 and PA2 are disabled), the first electronic switch 51 is turned to NO (normal open) position with the first electronic switch first terminal 3 coupled to the first electronic switch third terminal 89, and the second electronic switch 52 is also turned to the NO position with the second electronic switch first terminal 96 coupled to the second electronic switch third terminal 162. All attenuators are set at max. attenuation position (~open circuit status), phase shifters are in the middle range;

Step 2: Checking the possible interference amplitude range in four paths in sequence;

Step 3: building the look-up table; and

Step 4: Repeating the similar process in step 3 for the path of the second transmitter-the second receiver, the first transmitter-the second receiver, and the second transmitter-the first receiver.

The step 2 can begin at step 21 as below:

Step 21: (if possible) setting a terminator in the first antenna 61/second antenna 62 ports to reduce the antenna reflection.

Step 22: Setting the first transmitter 11 in normal operation power and PA1 in enable. The first electronic switch 51 is in NC (normal close) with the first electronic switch first terminal 3 coupled to the first electronic switch second terminal 37, the first attenuator 812 in appropriate scale such that A/D converter in the first receiver 91 can at good dynamic range.

Step 23: Measuring the all possible "peak level" in the first receiver 91. Keep the peak data D11 (Data from the first transmitter 11 to the first receiver 91).

Step 24: Repeating the same process from second transmitter 12 to the second receiver 92. Keep the peak data D22 (Data from the second transmitter 12 to the second receiver 92). Note that the major interference from the first transmitter 11 to the first receiver 91 or from the second transmitter 12 to the second receiver 92 is come from leakage from circulator to receiver in case of D11 and D22.

Step 25: Removing the terminator from every antenna port and install antennas in the ports.

Step 26: Repeating the same process of step 23-step 24 from the first transmitter 11 to the second receiver 92. Keep the peak data D12 (Date from the first transmitter 11 to the second receiver 92).

Step 27: Repeating the same process step 23-step 24 from the second transmitter 12 to the first receiver 91. Keep the peak data D21 (Date from the second transmitter 12 to the first receiver 91). Note that the major interference from the first transmitter 11 to the second receiver 92 or from the second transmitter 12 to the first receiver 91 is come from the mutual coupling between the first antenna 61 and second antenna 62, in case of D12 and D21.

The step 3 can begin at step 31 as below:

Step 31: Setting the first transmitter 11 in normal operation power and PA1 in disable. The first electronic switch 51 is in NO (normal open), the first attenuator 812 is in appropriate scale such that A/D converter in the first receiver 91 can at good dynamic range.

Step 32: controlling the first transmitter 11 to send out carrier signal without modulation, and measure the signal in the first receiver 91. During each measurement, we change all control variables which make the measured amplitude results are not far away from D11. At this time, we are likely to set D11 in the center of δa of the interference noise amplitude circle. The all measured data can be stored in a database and form a circle, which corresponding to 360-degree phase shift range. We may not get D11 exactly (C/N=1) in the measured data, but we can find a D11' which is the most close to D11 (C/N~=1) and is used as center in the lookup table. The carrier (C) to interference noise (N) ratio=1 means that we can find an ideal cancellation level to complete cancel out the interference noise. Normally, it is impossible. However, C/N~=1 is possible to get in our environment.

Step 33: based on cancellation requirement and the system phase resolution availability, we construct phase related data base at range over 360-degree.

Figure 13:
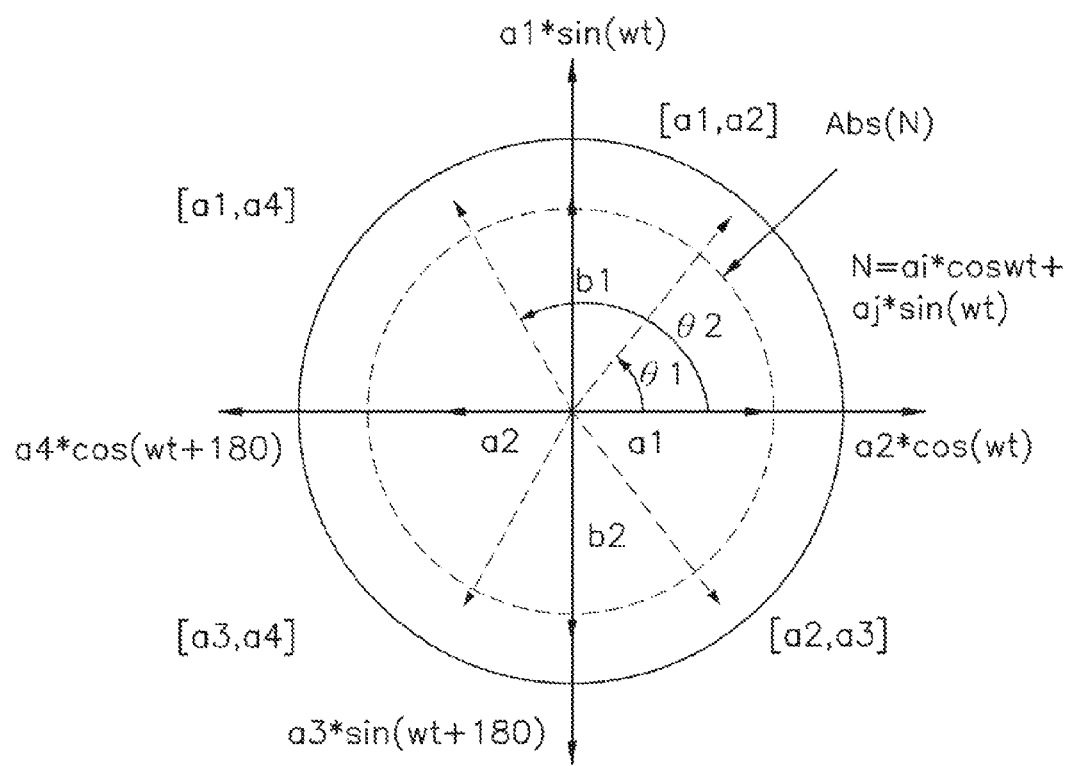
FIG. 13 is a schematic diagram of an embodiment of a fast cancellation condition search.

FIG. 13 illustrates a fast cancellation condition search in an embodiment. Initially, based on different circle amplitude, generate the look-up table for the specific radius on the four quadrant coefficient pair (a1, a2), (a1, a4), (a3, a4) and (a2, a3) or 5-section look-up table. Let the cancellation path's digital step attenuator in largest impedance (→close to open status). Adjust the first attenuator 812 and read the interference noise amplitude N from ADC output.

According to N value, search the appropriate pair (ai, aj) to find the best (least) residual of (ai, aj). During the search, the other non-related path were set to 32 dB (max. attenuation in DSA~open circuit).

The search sequence may use multi-resolution approach. It means use a large search step for rough result and finer step for precision result.

For a finite-size look up table, the search pair is an approximate solution. We may use more finer attenuation set or more paths to get more precision result.

Figure 14:
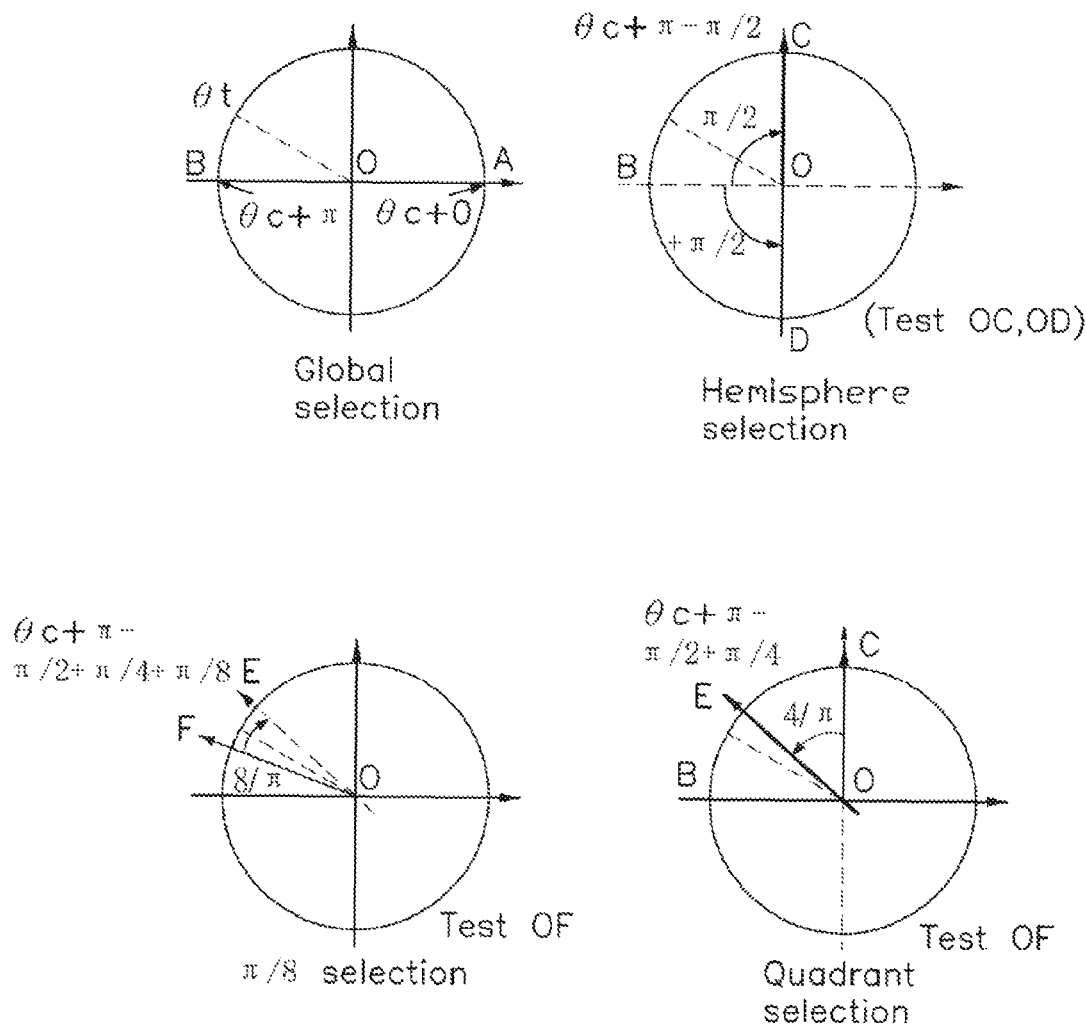
FIG. 14 is a schematic diagram of an embodiment of a sequential phase matching search in 4-quadrant.

FIG. 14 illustrates a sequential phase matching search in 4-quadrant in an embodiment. The "phase match" means both interference phase and cancellation phase have exactly 180-degree difference. The sequential phase matching search method can begin at step 141:

Step 141: Global section, which starts from either θc or θc+π, two tests can determine target in left or right part. θt is a targeted phase to be matched;

Step 142: Hemisphere selection, which checks both OC and OD, two tests can determine target's quadrant;

Step 143: Quadrant selection, which checks OE and compares OE with OB can determine target's location; and Step 144: π/8 selection, which checks OF and compares OF with OB can determine target's location.

Step 14n will be performed until cancellation error is less than pre-defined. In general, n<10.

The steps 141 and 142 define the working quadrant, and the further steps define the fine tune quadrant.

While the disclosure has been described by way of example and in terms of the embodiments, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. An antenna unit, comprising:
   a transmitter;
   a receiver;
   a circulator;
   a controller coupled to the transmitter and the receiver;
   an antenna coupled to the receiver through the circulator; and
   a first coupler comprising a first coupler first terminal that is coupled to the transmitter, a first coupler second terminal that is coupled to a calculator first terminal;
   a circulator comprising a second terminal that is coupled to the antenna and a circulator third terminal;
   a second coupler comprising a second coupler first terminal, a second coupler second terminal that is coupled to the circulator third terminal, and a second coupler third terminal that is coupled to the receiver;
   a first compensation circuit configured to compensate signals in amplitude and phase, a first compensation circuit input terminal coupled to the first coupler second terminal, and a first compensation circuit output terminal coupled to a second coupler fourth terminal;
   a first electronic switch comprising a first electronic switch first terminal that is coupled to the transmitter, a first electronic switch second terminal that is coupled to a first coupler third terminal, and a first electronic switch third terminal that is coupled to the first compensation circuit input terminal;
   wherein when the first electronic switch third terminal is coupled to the first electronic switch first terminal, the antenna is in a first mode; and when in the first mode the transmitter outputs a first signal to the first compensation circuit, the first signal is transmitted through the circulator first terminal and the circulator second terminal to the antenna, the first compensation circuit process the first signal and outputs a first suspension signal to the second coupler, the second coupler first terminal receives a second signal from the circulator, and the second coupler couples the second signal and the first suspension signal and outputs a third signal to the receiver.

2. The antenna unit as claim 1, further comprising a phase shifting circuit configured to shift phase of signals and an attenuation circuit for attenuation of signals.

3. The antenna unit as claim 2, wherein the phase shifting circuit comprises a plurality of power dividers and a second electronic switch, and the second electronic switch is configured to shift phase of signals.

4. The antenna unit as claim 2, wherein the attenuation circuit comprises a plurality of attenuators coupled in parallel.

5. The antenna unit as claim 1, further comprising a system controller to adjust parameters of the first compensation circuit.

6. The antenna unit as claim 1, wherein the first compensation circuit comprises a 90-degree hybrid power divider, two digital step attenuators, and a Wilkinson power combiner.

7. The antenna unit as claim 1, wherein the first compensation circuit comprises a Wilkinson hybrid power divider, two digital step attenuators, and a Wilkinson power combiner.

8. The antenna unit as claim 1, wherein a cancellation path is defined from the transmitter, the first coupler, the first compensation circuit, the circulator, the antenna, and the receiver, and the cancellation path is linearized.

9. A compensation circuit configured to compensate signals in amplitude and phase, comprising:
a phase shifting circuit comprising a plurality of phase shifters coupled in parallel; and
an attenuation circuit coupled to the phase shifting circuit and comprising a plurality of attenuators coupled in parallel;
wherein the phase shifting circuit comprises a first power divider, a second power divider, a third power divider, a fourth power divider, a fifth power divider, a sixth power divider, and a first electronic switch, a first power divider input terminal configured to receive signals, a first power divider first output terminal coupled to a second power divider input terminal, a first power divider second output terminal coupled to a third power divider input terminal, a second power divider first output terminal coupled to a first electronic switch first terminal, a second power divider second output terminal coupled to a first electronic switch second terminal, a third power divider first output terminal coupled to a first electronic switch third terminal, a third power divider second output terminal coupled to a first electronic switch fourth terminal, a first electronic switch control terminal coupled to a fourth power divider input terminal, a fourth power divider first output terminal coupled to a fifth power divider input terminal, a fourth power divider second output terminal coupled to a sixth power divider input terminal.

10. The compensation circuit as claim 9, wherein the attenuation circuit comprises a first attenuator, a second attenuator, a third attenuator, a fourth attenuator, a first power combiner, a second power combiner, a third power combiner, a fifth power divider first output terminal coupled to a first attenuator input terminal, a fifth power divider second output terminal coupled to a second attenuator input terminal, a sixth power divider first output terminal coupled to a third attenuator input terminal, a sixth power divider second output terminal coupled to a fourth attenuator input terminal, a first attenuator output terminal coupled to a first power combiner first input terminal, a second attenuator output terminal coupled to a first power combiner second input terminal, a third attenuator output terminal coupled to a second power combiner first input terminal, a fourth attenuator output terminal coupled to a second power combiner second input terminal, a first power combiner output terminal coupled to a third power combiner first input terminal, a second power combiner output terminal coupled to a third power combiner second input terminal of the, a third power combiner output terminal configured to output signals.

11. A MIMO system, comprising:
a first antenna unit comprising a first transmitter, a first receiver, a first circulator, a first compensation circuit, a second compensation circuit, a first antenna, and a first electronic switch; and
a second antenna unit comprising a second transmitter, a second receiver, a second circulator, a third compensation circuit, a fourth compensation circuit, a second antenna, and a second electronic switch;
wherein the first compensation circuit and the second compensation circuit are configured for suspension of noise in signals received by the first transmitter, the third compensation circuit and the fourth compensation circuit are configured for suspension of noise in signals receives by the second transmitter, the first compensation circuit is configured for suspension of noise in leaked signals from the first circulator, the second compensation circuit is configured for suspension of noise in near field signals received by the first antenna unit, the third compensation circuit is configured for suspension of noise in leaked signals from the second circulator, the fourth compensation circuit is configured for suspension of noise in near field signals received by the second antenna unit; and wherein the first antenna unit comprises a first coupler, a second coupler, and a third coupler, a first coupler first terminal coupled to the first transmitter through a first amplifier, a first coupler second terminal coupled to a first circulator first terminal, a first circulator second terminal coupled to the first antenna, a second coupler first terminal coupled to a first circulator third terminal, a second coupler second terminal coupled to the first receiver, a first compensation circuit input terminal coupled to a third coupler second terminal, a first compensation circuit output terminal coupled to a second coupler fourth terminal, a third coupler third terminal coupled to a fourth compensation circuit input terminal, a first electronic switch first terminal coupled to the first transmitter, a first electronic switch second terminal coupled to a first coupler third terminal, a first electronic switch third terminal coupled to the first compensation circuit input terminal.

12. The MIMO system as claim 11, wherein the first compensation circuit further comprises a phase shifting circuit configured to shift phase of signals and an attenuation circuit for attenuation of signals.

13. The MIMO system as claim 11, wherein each of the first antenna unit and the second antenna unit comprises a phase shifting circuit configured to shift phase of signals and an attenuation circuit for attenuation of signals.

14. The MIMO system as claim 13, wherein the phase shifting circuit comprises a plurality of power dividers and the second electronic switch, and the second electronic switch is configured to shift phase of signals.

15. The MIMO system as claim 13, wherein the attenuation circuit comprises a plurality of attenuators coupled in parallel.

16. The MIMO system as claim 11, wherein each of the first antenna unit and the second antenna unit comprises a system controller to adjust parameters of the first compensation circuit.

17. The MIMO system as claim 11, wherein the first compensation circuit comprises a 90-degree hybrid power divider, two digital step attenuators, and a Wilkinson power combiner.

18. The MIMO system as claim 11, wherein the first compensation circuit comprises a Wilkinson hybrid power divider, two digital step attenuators, and a Wilkinson power combiner.

19. The MIMO system as claim 11, wherein a cancellation path is defined from the first transmitter, the first coupler, the first compensation circuit, the first circulator, the first antenna, and the first receiver, and the cancellation path is linearized.

* * * * *